Jan. 8, 1963 E. HAHN 3,072,032
PHOTOGRAPHIC CAMERAS
Filed July 17, 1961
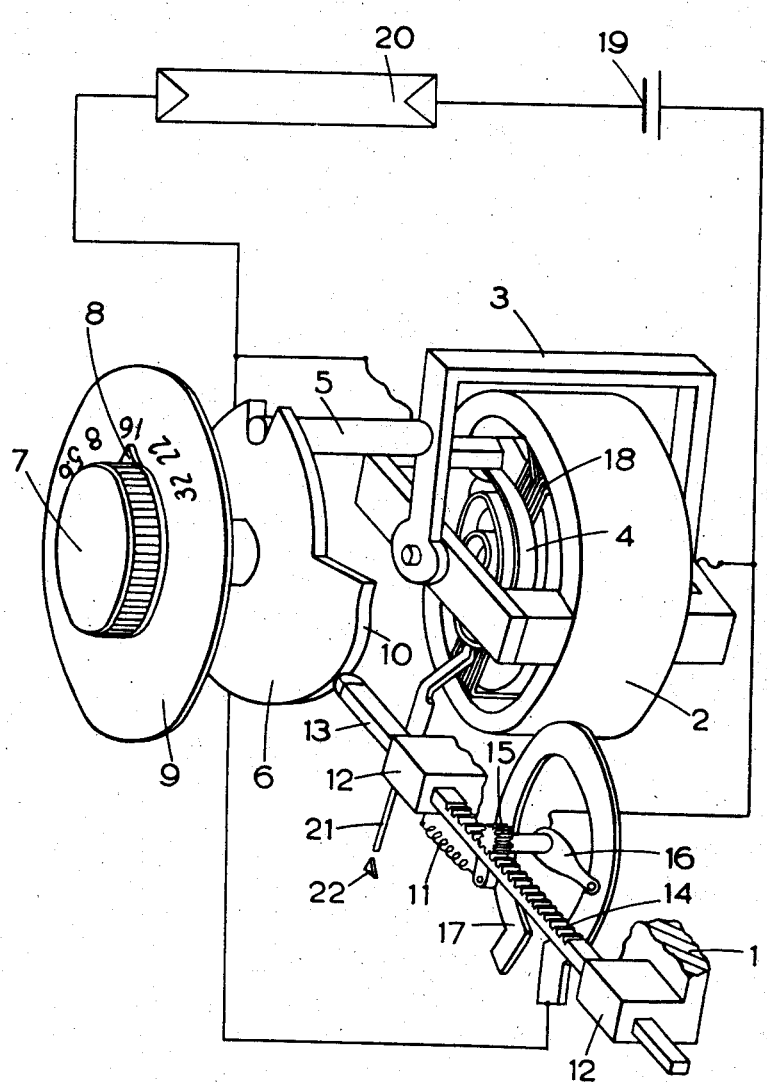
INVENTOR
ERICH HAHN
By Irwin J. Thompson
ATTY.

United States Patent Office 3,072,032
Patented Jan. 8, 1963

3,072,032
PHOTOGRAPHIC CAMERAS
Erich Hahn, Dresden, Germany, assignor to VEB Kamera- und Kinowerke Dresden, Dresden, Germany
Filed July 17, 1961, Ser. No. 124,594
3 Claims. (Cl. 95—10)

This invention relates to a photographic camera with a photo-electric exposure control device, the setting disc of which, coupled with at least one of the setting members for the exposure factors such as diaphragm and exposure time of the camera shutter, shifts a pointer and the return springs of the moving coil, and varies a resistance lying in the meter current circuit and influencing the characteristics of the meter.

In known devices of this kind the desired characteristic alone is influenceable by the resistance. Accordingly it is necessary to design the resistance according to this characteristic, technological limits being set however to the voluntary dimensioning of the resistance, especially the subsequent correction of its dimensioning. Accordingly here the adaptation of the resistance to the desired characteristic involves a possibly time-wasting selection from an assortment of a plurality of resistances and nevertheless is only approximately possible. Furthermore in the known embodiments a repeated increase and decrease of the deflection sensitivity of the meter which may become necessary, that is to say switching of the resistance from higher to lower values and vice versa, as the rotation of the setting member progresses, is not possible.

In accordance with the invention this is achieved due to the fact that between the setting disc and the setting contact of the resistance there is arranged a control gearing, the variable transmission ratio of which corresponds to the desired characteristic of the measuring mechanism. The setting disc is preferably provided with a control cam with which there engages a feeler pin coupled with the setting contact of the resistance. According to an expedient gear arrangement the feeler pin has a toothing with which there meshes a pinion of the setting contact. The details of the invention may be seen from an illustrated and described example of embodiment.

In a camera housing 1 (not especially represented) there is arranged the core magnet measuring mechanism 2. The adjustable stirrup 3 of the measuring mechanism holds the return springs 4 and is geared through the coupling pin 5 with the setting disc 6. The setting member 7 is coupled rigidly with this setting disc 6 and its mark 8 slides over a scale disc 9 with values for exposure factors. This setting member can also be constructed in known manner as part of a differential gearing.

The feeler pin 13 sliding in guides 12 is pressed by the spring 11 against the control cam 10 of the setting disc 6. The toothing 14 of the feeler pin 13 meshes with the pinion 15, which is rigidly connected with the setting contact 16 of the resistance 17. The electrical resistance, variable through the setting contact 16, is connected in parallel with the moving coil 18 of the measuring mechanism 2 on the photo-conductive cell 20 fed by the battery 19.

The manner of operation is as follows:

If light impinges upon the photo-conductive cell 20, the current flux in the meter current circuit varies, resulting in a deflection of the moving coil 18. A setting of the exposure factors (e.g. diaphragm aperture or exposure time) corresponding to the prevailing brightness is achieved, when the pointer 21 stands opposite the fixed mark 22. This coincidence is effected by rotation of the setting member 7, when the stirrup 3 carrying the return spring 4 is entrained through the setting disc 6 and the coupling pin 5. At the same time through the control cam 10 the feeler pin 13 is shifted, whereby the setting contact 16 moves along the resistance 17 and thus allocates to each position of the setting disc 6 any desired value of the electric resistance in the meter current circuit.

By so shaping the profile of the control cam 10 to give a non-linear transmission ratio the desired characteristic of the measuring meter is determinable; in this example the sensitivity of the measuring mechanism is increased in the lower and upper measurement ranges and reduced in the medium measurement range. This change in the transmission ratio is obtained by the cam 10, the radial dimensions of which increase and decrease alternately as shown in the drawing, so that the rod 13 is reciprocated together with the sliding contact 16. When maintaining one direction of rotation of the cam disc 6, the resistance is consequently successively increased and reduced. Equal rotational angles of the cam disc 6 thus not only result in different changes in the travel of the rod 13, but also in different directions of displacement of the rod 13.

Photoelectric meter devices exhibit non-linear characteristics, such that for instance, a doubling of the current from the photocell does not always represent a doubling of the prevailing brightness. However, in order to adjust to a linear scale (e.g. the scale on the disc 9, for the adjustable exposure factor) some compensation must be made.

I claim:
1. In a photographic camera having exposure factor setting means, an exposure meter including a moving coil rotatably mounted on a spindle on a fixed part of the camera for rotation in relation to a magnet arranged in the camera and a return spring connected between the spindle of said moving coil and a spring anchorage pivotally mounted on a fixed part of the camera, the provision of a setting member operatively connected to said exposure factor setting means and to said spring anchorage, a variable resistor having a setting contact and connected in the electrical circuit of the exposure meter, and coupling means operatively connected between said setting member and the setting contact of the variable resistor, said coupling means having a non-linear transmission ratio according to the desired characteristics of the exposure meter.

2. In a photographic camera having an exposure factor setting means, an exposure meter including a moving coil rotatably mounted on a spindle on a fixed part of the camera for rotation in relation to a magnet arranged in the camera, and a return spring connected between the spindle of said moving coil and a spring anchorage pivotally mounted on a fixed part of the camera, the provision of a setting member operatively connected to said exposure factor setting means and to said spring anchorage, a variable resistor having a setting contact and connected in the electrical circuit of the exposure meter, a cam element operatively connected to said setting member and rotatable thereby, a follower in engagement with said cam element, and a couple device connected between said follower and the setting contact of the variable resistor, said cam being profiled according to the desired characteristics of the exposure meter.

3. A photographic camera according to claim 2, wherein said follower is provided with a toothed rack and said setting contact is provided with a pinion meshing with said toothed rack.

References Cited in the file of this patent
UNITED STATES PATENTS
2,351,978 Kuppenbender _____ June 20, 1944
3,000,280 Faulhaber _____ Sept. 19, 1961